May 3, 1955   C. H. THOMPSON   2,707,542
CENTRIFUGAL CLUTCH
Filed Sept. 22, 1953   2 Sheets-Sheet 1
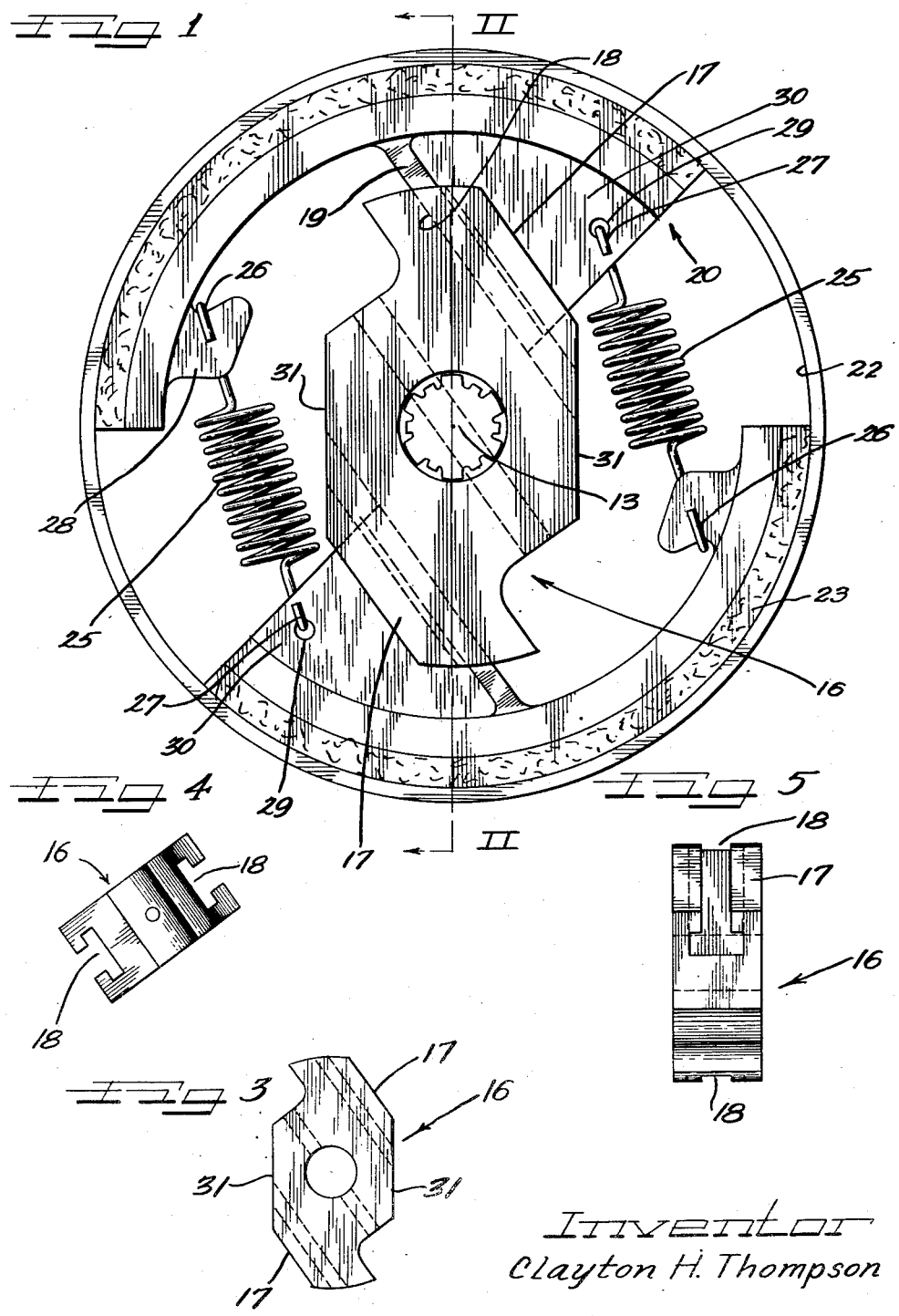
Inventor
Clayton H. Thompson

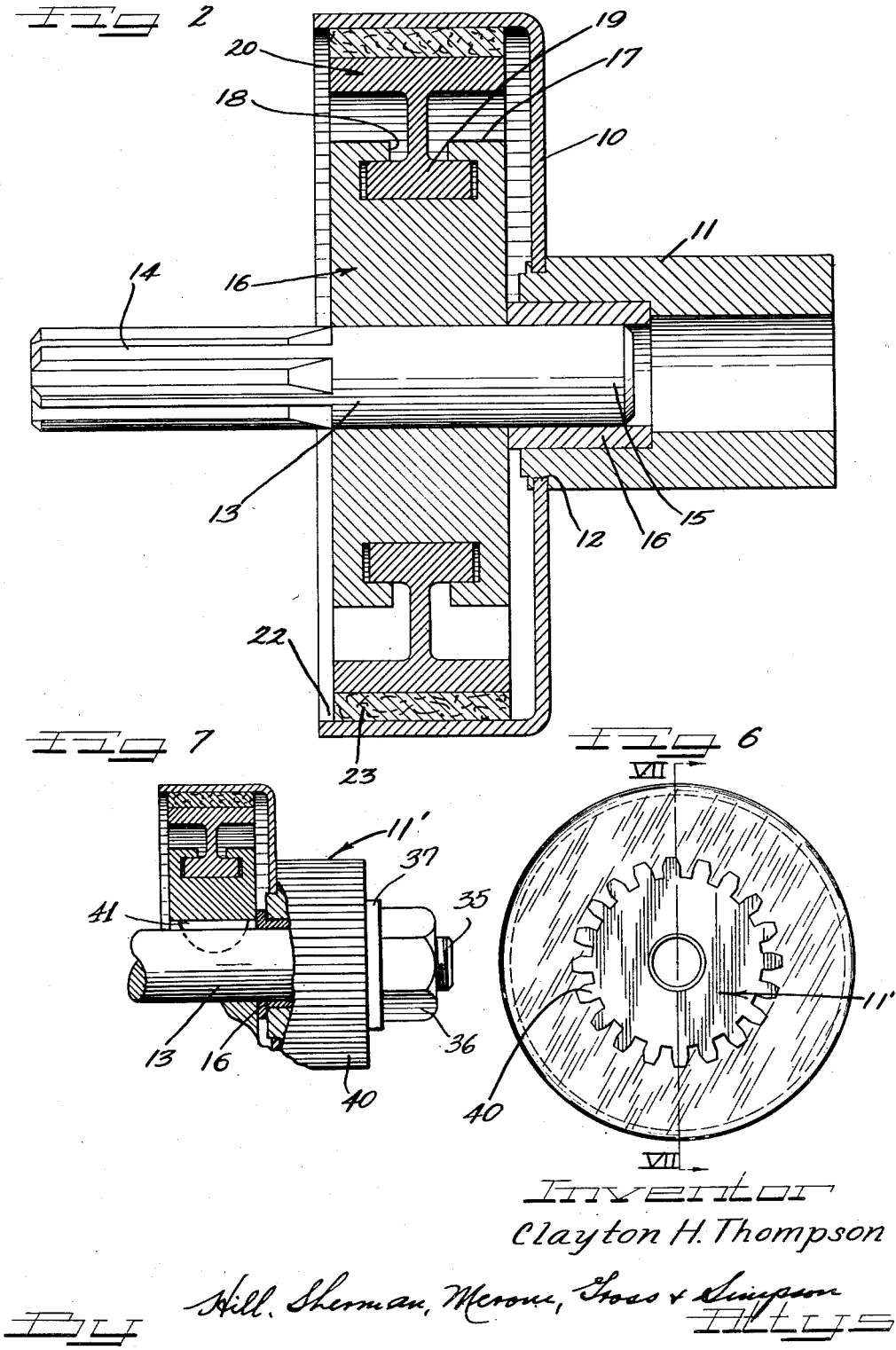

United States Patent Office 2,707,542
Patented May 3, 1955

2,707,542
CENTRIFUGAL CLUTCH

Clayton H. Thompson, Elgin, Ill., assignor to Elgin Sweeper Company, Elgin, Ill., a corporation of Illinois Application September 22, 1953, Serial No. 381,620

3 Claims. (Cl. 192—105)

This invention relates to centrifugal clutches and more particularly to the manner in which the shoes are interconnected and are operatively driven by a central hub part.

It is an object of this invention to provide a simpler form of centrifugal clutch which lends itself to economic manufacture on a production or volume basis.

Another object of this invention is to provide a centrifugal clutch wherein the required machining operations are substantially reduced to enable cheaper manufacture of the clutch on a volume basis.

In accordance with the general features of this invention, there is provided in a centrifugal clutch, spaced centrifugal shoes for engaging the internal surface of a cylindrical member to be driven, preloaded restraining spring connecting the shoes together, a central driving hub part adapted to be driven by a central drive shaft at its axis, each of the shoes being connected to the hub part solely by a slide connection, the hub part having inclined substantially parallel side edges on opposite sides of its axis for supporting the shoes for sliding movement in opposite directions away from the axis, each of the slide connections comprising a tongue and groove between one of the side edges and the associated shoe, the hub part having portions between the side edges formed to afford clearance for the springs connecting the shoes together independently of the hub part.

Another feature of the invention relates to providing each of the clutch shoes at opposite ends with spring engaging lugs, each of which lugs is connected by a spring to an adjacent lug at an adjoining shoe end.

Yet, another feature of the invention relates to the aforesaid driver or central hub part having its cut-away portions defined by parallel sides at an angle to the inclined slide edges and disposed on opposite sides of the shaft axis between the inclined side edges.

Other objects and features of this invention may more fully appear from the following detailed description taken in connection with the accompanying drawings which illustrate several embodiments thereof and in which Figure 1 is a side view of my novel clutch showing the shoes in frictional driving engagement with the drum of the clutch;

Figure 2 is a vertical cross-sectional view taken on substantially the line II—II of Figure 1 looking in the direction indicated by the arrows;

Figure 3 is a detail view showing the side elevation of the central driver with the T-shaped slots or grooves therein shown by dotted lines;

Figure 4 is a projected edge view of the driver shown in Figure 3 looking into the T-shaped slots on opposite sides of the center of the driver;

Figure 5 is a side view of the driver or hub part looking at it from the right-hand side of Figure 3;

Figure 6 is an end view of a modified form of clutch showing the drum as being provided with an integral gear; and Figure 7 is a fragmentary vertical cross-sectional view taken on the line VII—VII of Figure 6 looking in the direction indicated by the arrows.

As shown on the drawings:

The centrifugal clutch herein disclosed is more or less of a conventional type with the exception of the improvements herein noted.

This clutch includes a hollow or dished metal drum 10 to be driven and from which projects a hollow driven member 11 suitably interlocked at 12 to the side wall of the drum 10 (Fig. 2). Disposed centrally of the clutch drum 10 and the member 11 is a driving shaft 13 having an outer splined end 14 for suitable connection in a conventional manner to driving means and an inner end 15 journalled in a bearing 16 secured in the tubular or hollow driven member 11 (Fig. 2).

Suitably secured to the shaft 13 inside of the drum 10 is a central driver or hub part designated generally by the reference character 16 and which embodies the features of this invention (Fig. 1). This driver has parallel inclined straight edges 17—17 on opposite sides of the shaft 13, each of which has a longitudinal T-shaped slot or groove 18 for slidably receiving a T-shaped tongue 19 (Fig. 2) integrally formed with a shoe 20.

The centrifugal clutch shoes 20 are, as well-known in the art, of arcuate segmental form and in the illustrated embodiment are shown as comprising two diametrically opposite shoes movable in opposite directions into engagement with the inner surface 22 (Fig. 2) of the drum 10. The shoes may be of any suitable or desired number and each has its peripheral surface provided with a frictional material 23 as is also well-known in the art.

The central hub or driver 16 can be made of any suitable material although it is preferably cast. Excellent results may be obtained by making it of aluminum which enables a substantial reduction of weight as compared to shoes made of steel or iron. The use of the cast metal driver allows considerable flexibility in regard to its central hollow diameter for various shaft sizes. In this respect the shoe could be cast without the hole and later the proper size hole could be readily drilled and reamed to suit the particular requirements.

The T-shaped slots or grooves 18 are cored in the cast driver or hub part. In fact, I find that this procedure eliminates any need for machining the T-shaped slots. Actually the T-shaped slots are made slightly larger than the T-shaped tongues or slides 19 so that the tongues have a loose fit in the slots thereby permitting self-alignment of the shoes with the inside surface 22 of the drum.

In accordance with the features of this invention the shoes are not, in any way, connected to the driver 16 with the exception of the sliding fit of their tongues 19 in the T-shaped slots 18. This is enabled by reason of the fact that the springs 25—25, interconnecting adjoining ends of the shoes on opposite sides of the shaft, are not, in any way, secured to the driver or hub part 16. Each tension spring is preloaded so as to hold the shoes out of engagement with the drum until the drive shaft 13 reaches a predetermined speed at which it is desired that the centrifugal force be sufficient to overcome the springs and force the shoes into driving engagement with the drum.

Each spring has its ends formed into hooks 26—27. The hook 26 of each spring is hooked over a lug or terminal 28 formed integral with one end of the shoe and the other end 27 of each spring is anchored to the adjoining end of the other shoe. In reality, the end 27 of the spring is hooked into a hole 29 in an integral flange portion of the shoe which comprises in itself the lug terminal for receiving the hooked end of the spring.

Now, it will also be noted that the driver or hub part 16 has portions cut away between the inclined parallel edges 17 and that these cut-away portions are defined by parallel sides 31—31 on opposite sides of the shaft 13 (Fig. 1). I find that by casting the driver with the relieved straight edges 31 ample clearance can be provided for the springs and their application to the shoes is enabled with facility.

In Figs. 6 and 7 I have illustrated a modification of the invention for use with a standard power take-off shaft and wherein the clutch is identical to that shown in Figure 2 with the exception that the driven member 11' includes a gear 40. In other words, the driven member 11' is in the form of a gear in which the inner end of shaft 13 is journalled in bearing sleeve 16 in the same manner as in Figure 2. The end of shaft 13 is reduced and threaded at 35 beyond the gear 11' and has on it a threaded nut 36 bearing against a thrust washer 37 which in turn bears against an end of gear 40. Shaft 13 is shown in this form as being keyed to the clutch driver 16 by a spline 41.

The gear 40 may be copper brazed to the clutch drum 10 which can freely rotate on bearing sleeve 16 when not being driven.

I claim as my invention:

1. In a centrifugal clutch, spaced centrifugal shoes for engaging the internal surface of a cylindrical member to be driven, preloaded restraining springs solely between and connecting said shoes together, a unitary one-piece central driving hub part adapted to be driven by a central drive shaft at its axis, each of said shoes being connected to said hub part solely by a slide connection, said one-piece hub part having inclined substantially parallel side edges on opposite sides of its axis for supporting said shoes for sliding movement in opposite directions away from said axis, each of said slide connections comprising a tongue and groove between one of said side edges of said hub part and the associated shoe, said hub part having portions between said side edges formed to afford clearance for said springs connecting said shoes together independently of said hub part.

2. In a centrifugal clutch, spaced centrifugal shoes for engaging the internal surface of a cylindrical member to be driven, preloaded restraining springs solely between and connecting said shoes together, a unitary one-piece central driving hub part adapted to be driven by a central drive shaft at its axis, each of said shoes being connected to said hub part solely by a slide connection, said one-piece hub part having inclined side edges on opposite sides of its axis for supporting said shoes for sliding movement in opposite directions away from said axis, each of said slide connections comprising a tongue and groove between one of said side edges of said hub part and the associated shoe, said hub part having portions between said side edges formed to afford clearance for said springs connecting said shoes together independently of said hub part, each of said shoes having at opposite ends spring engaging terminals each of which terminals is connected by one of said springs to an adjacent terminal on the adjoining shoe end.

3. In a centrifugal clutch, spaced centrifugal shoes for engaging the internal surface of a cylindrical member to be driven, preloaded restraining springs solely between and connecting said shoes together, a unitary one-piece central driving hub part adapted to be driven by a central drive shaft at its axis, each of said shoes being connected to said hub part solely by a slide connection, said one-piece hub part having inclined substantially parallel side edges on opposite sides of its axis for supporting said shoes for sliding movement in opposite directions away from said axis, each of said slide connections comprising a tongue and groove between one of said side edges of said hub part and the associated shoe, said hub part having portions between said side edges relieved to afford clearance for said springs connecting said shoes together independently of said hub part, said relieved portions being defined by parallel sides on said hub part at an angle to said inclined edges and disposed on opposite sides of said axis between said inclined side edges.

References Cited in the file of this patent

UNITED STATES PATENTS

| | | |
|---|---|---|
| 844,384 | Meston et al. | Feb. 19 1907 |
| 1,077,728 | Mann | Nov. 4, 1913 |
| 1,943,930 | Rock | Jan. 16, 1934 |
| 2,032,066 | Nieman et al. | Feb. 25, 1936 |
| 2,552,747 | Strimple et al. | May 15, 1951 |

FOREIGN PATENTS

| | | |
|---|---|---|
| 259,508 | Italy | Aug. 4, 1928 |